US009100578B2

(12) United States Patent
Hasegawa

(10) Patent No.: US 9,100,578 B2
(45) Date of Patent: Aug. 4, 2015

(54) IMAGE PROCESSING APPARATUS AND CONTROL METHOD FOR THE SAME

(75) Inventor: Takashi Hasegawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 142 days.

(21) Appl. No.: 13/182,624

(22) Filed: Jul. 14, 2011

(65) Prior Publication Data
US 2012/0050559 A1 Mar. 1, 2012

(30) Foreign Application Priority Data

Aug. 31, 2010 (JP) ................................. 2010-195056

(51) Int. Cl.
*H04N 5/232* (2006.01)
*H04N 5/235* (2006.01)

(52) U.S. Cl.
CPC ......... *H04N 5/2351* (2013.01); *H04N 5/23212* (2013.01)

(58) Field of Classification Search
CPC .................................................. H04N 5/23212
USPC ............................................... 348/222.1, 267
See application file for complete search history.

(56) References Cited

U.S. PATENT DOCUMENTS

| 2005/0093886 | A1* | 5/2005 | Kubota | 345/619 |
| 2007/0031060 | A1* | 2/2007 | Okada | 382/274 |
| 2008/0112644 | A1* | 5/2008 | Yokohata et al. | 382/278 |
| 2008/0310700 | A1* | 12/2008 | Fukusawa et al. | 382/141 |

FOREIGN PATENT DOCUMENTS

| JP | 2001-197358 A | 7/2001 |
| JP | 2003-006631 | 1/2003 |

OTHER PUBLICATIONS

The above reference was cited in a Aug. 24, 2012 Japanese Office Action, which is enclosed without English Translation, that issued in Japanese Patent Application No. 2010-195056.

\* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

There is provided an image processing apparatus comprising: an acquisition unit configured to acquire an image signal; a setting unit configured to set, in an image expressed by the image signal, a plurality of evaluation areas to be targets of evaluation value calculation; a dividing unit configured to divide the image expressed by the image signal into a plurality of divided image areas; and a plurality of calculation units configured to acquire, from the dividing unit, divided image signals respectively corresponding to the plurality of divided image areas, and calculate evaluation values for the plurality of evaluation areas based on evaluation area image signals respectively corresponding to the plurality of evaluation areas included in the divided image areas. Among the plurality of evaluation areas, the plurality of calculation units do not calculate an evaluation value for each evaluation area that spans two or more of the divided image areas.

13 Claims, 9 Drawing Sheets

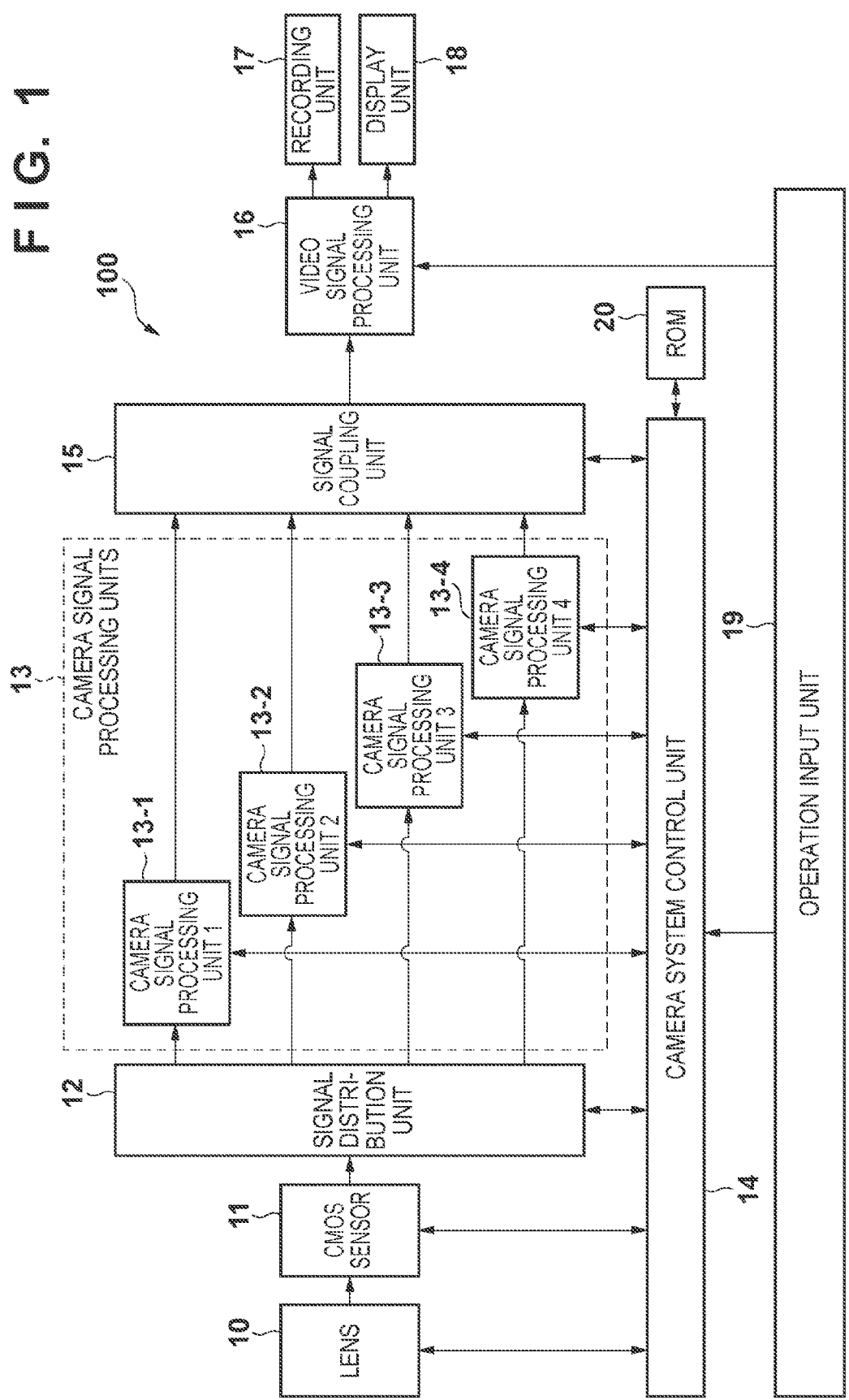

FIG. 2A

| SENSOR AREA 1 (SIGNAL PROCESSING BY SIGNAL PROCESSING UNIT 1) | SENSOR AREA 2 (SIGNAL PROCESSING BY SIGNAL PROCESSING UNIT 2) |
|---|---|
| SENSOR AREA 3 (SIGNAL PROCESSING BY SIGNAL PROCESSING UNIT 3) | SENSOR AREA 4 (SIGNAL PROCESSING BY SIGNAL PROCESSING UNIT 4) |

FIG. 2B

SENSOR AREA 1 | SENSOR AREA 2
SENSOR AREA 3 | SENSOR AREA 4

| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |

FIG. 2C

SENSOR AREA 1 | SENSOR AREA 2
SENSOR AREA 3 | SENSOR AREA 4

| A1 | A2 | A3 | A4 | A5 | A6 | A7 |
| B1 | B2 | B3 | B4 | B5 | B6 | B7 |
| C1 | C2 | C3 | C4 | C5 | C6 | C7 |
| D1 | D2 | D3 | D4 | D5 | D6 | D7 |
| E1 | E2 | E3 | E4 | E5 | E6 | E7 |
| F1 | F2 | F3 | F4 | F5 | F6 | F7 |

FIG. 2D

SENSOR AREA 1 | SENSOR AREA 2
SENSOR AREA 3 | SENSOR AREA 4

| A1 | A2 | A3 | A4 | A5 | A6 | A7 | A8 | A9 | A10 | A11 | A12 | A13 | A14 | A15 |
| B1 | B2 | B3 | B4 | B5 | B6 | B7 | B8 | B9 | B10 | B11 | B12 | B13 | B14 | B15 |
| C1 | C2 | C3 | C4 | C5 | C6 | C7 | C8 | C9 | C10 | C11 | C12 | C13 | C14 | C15 |
| D1 | D2 | D3 | D4 | D5 | D6 | D7 | D8 | D9 | D10 | D11 | D12 | D13 | D14 | D15 |
| E1 | E2 | E3 | E4 | E5 | E6 | E7 | E8 | E9 | E10 | E11 | E12 | E13 | E14 | E15 |
| F1 | F2 | F3 | F4 | F5 | F6 | F7 | F8 | F9 | F10 | F11 | F12 | F13 | F14 | F15 |
| G1 | G2 | G3 | G4 | G5 | G6 | G7 | G8 | G9 | G10 | G11 | G12 | G13 | G14 | G15 |
| H1 | H2 | H3 | H4 | H5 | H6 | H7 | H8 | H9 | H10 | H11 | H12 | H13 | H14 | H15 |
| J1 | J2 | J3 | J4 | J5 | J6 | J7 | J8 | J9 | J10 | J11 | J12 | J13 | J14 | J15 |

FIG. 4

|  | SENSOR AREA 1 | | | | SENSOR AREA 2 | | |
|---|---|---|---|---|---|---|---|
| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
|  | SENSOR AREA 3 | | | | SENSOR AREA 4 | | |

⇩

|  | SENSOR AREA 1 | | | | SENSOR AREA 2 | | |
|---|---|---|---|---|---|---|---|
| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
|  | SENSOR AREA 3 | | | | SENSOR AREA 4 | | |

⇩

|  | SENSOR AREA 1 | | | | SENSOR AREA 2 | | |
|---|---|---|---|---|---|---|---|
| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
|  | SENSOR AREA 3 | | | | SENSOR AREA 4 | | |

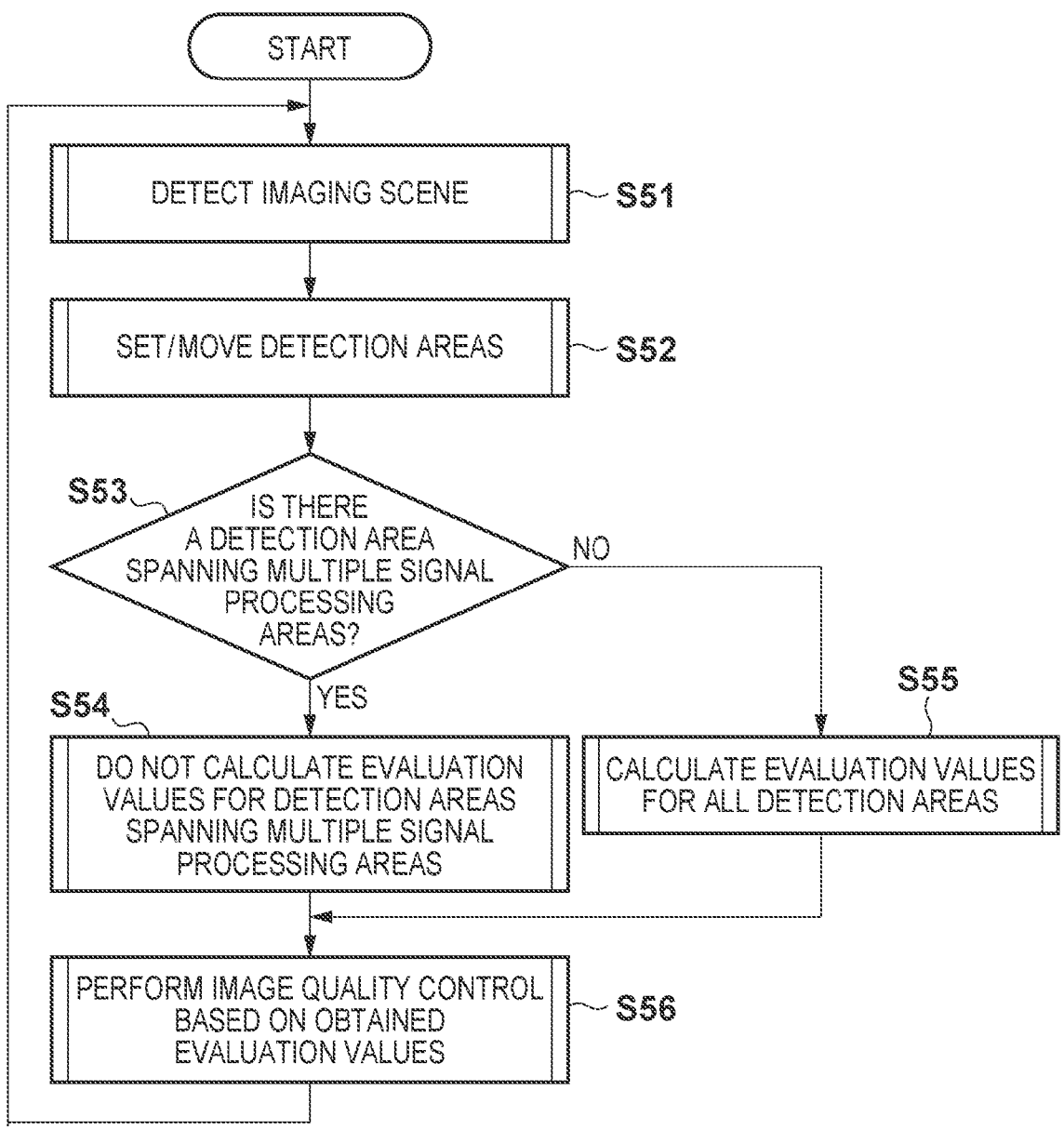

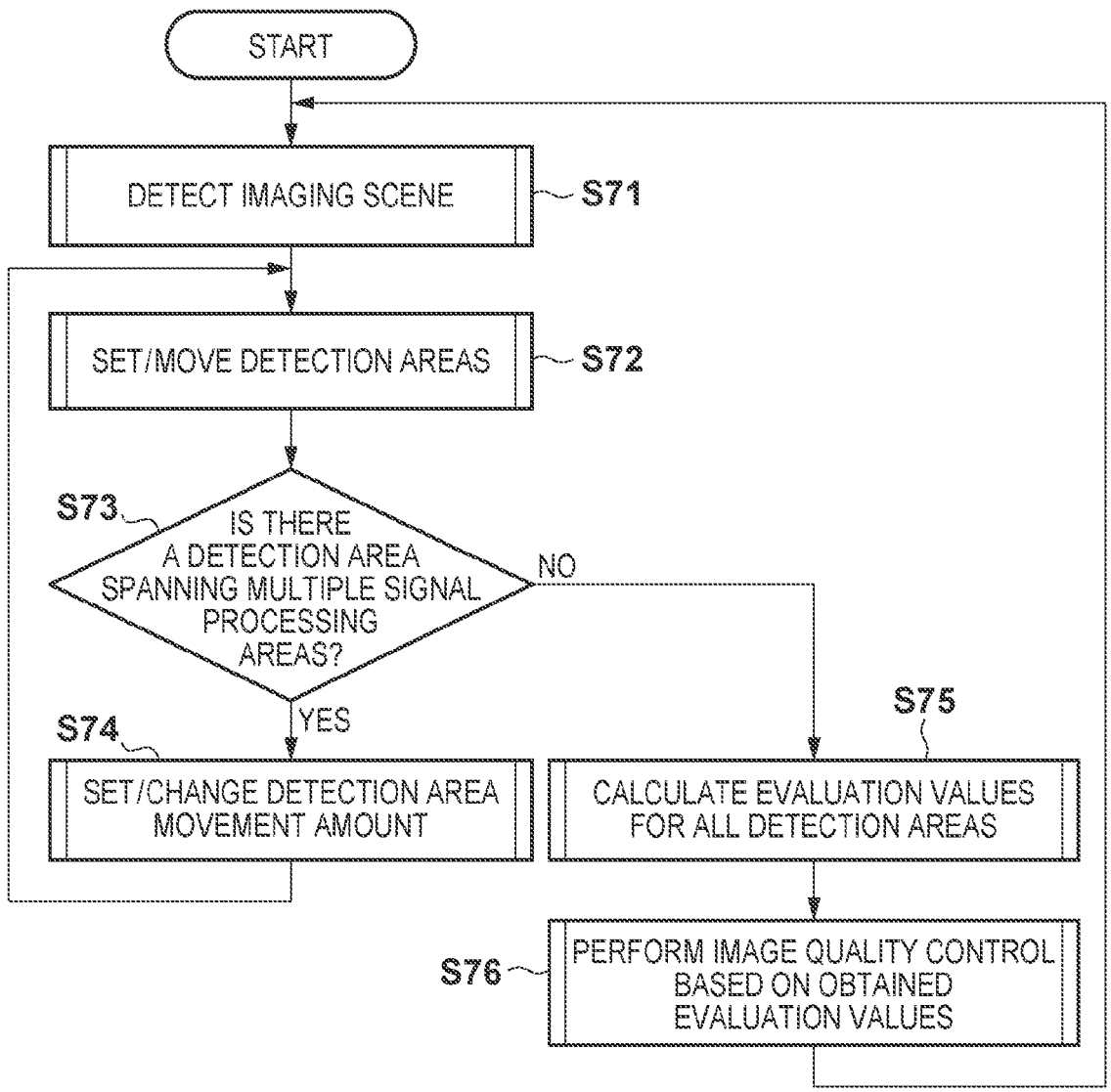

IMAGE PROCESSING APPARATUS AND CONTROL METHOD FOR THE SAME

BACKGROUND OF THE INVENTION

1. Field of the Invention

The present invention relates to an image processing apparatus and a control method for the same.

2. Description of the Related Art

As technology for controlling the image quality of video captured by a digital video camera or the like, there is known to be technology for setting a predetermined area (detection area) in a video, calculating an evaluation value from the video signal in the detection area, and performing image quality control based on the evaluation value. In one specific known example, an exposure evaluation value related to the exposure condition of the video in the detection area is calculated, and exposure control is performed based on the exposure evaluation value. Other known examples include focus control based on a focus evaluation value related to the focus condition of the video in the detection area, white balance control based on a color evaluation value related to colors in the video in the detection area, and anti-shake control based on a motion vector evaluation value related to a motion vector in the video in the detection area.

Although the method for setting the detection area and the method for calculating the evaluation value differ depending on the type of evaluation value, in general, multiple detection areas are set. The evaluation value for a specified detection area does not always appropriately reflect the condition of the whole area of the video, but it can be expected that setting multiple detection areas will allow evaluation values as a whole to more appropriately reflect the condition of the whole area of the video.

Recent years have seen advances in the development of televisions with resolution higher than high-definition, typified by 4 K×2 K, and the development of high-resolution imaging elements, which have been accompanied by the development of video signal processing technology that takes the increase of video resolution into consideration. As one example, there is known to be technology for dividing a video signal into multiple areas, and processing the video signals of the areas in parallel using multiple signal processing units (Japanese Patent Laid-Open No. 2003-6631).

In the case where a video in which a detection area has been set is divided into multiple areas, and the video signals of the areas are processed in parallel using multiple signal processing units according to conventional technology, there is the possibility of a detection area spanning more than one of the divided areas. Calculating an evaluation value for a detection area that spans multiple areas requires multiple signal processing units to perform calculation in cooperation, thus requiring data to be transferred between the signal processing units and requiring a memory or the like for such data transfer. This can consequently cause problems such as an increase in processing time and a rise in cost. Such problems are not limited to video, and can also arise when calculating an evaluation value for a detection area set in a still image.

SUMMARY OF THE INVENTION

The present invention has been achieved in light of such a situation, and provides technology for suppressing the occurrence of the calculation of an evaluation value for a detection area that spans multiple areas obtained by dividing an image.

According to a first aspect of the present invention, there is provided an image processing apparatus comprising: an acquisition unit configured to acquire an image signal; a setting unit configured to set, in an image expressed by the image signal, a plurality of evaluation areas to be targets of evaluation value calculation; a dividing unit configured to divide the image expressed by the image signal into a plurality of divided image areas; and a plurality of calculation units configured to acquire, from the dividing unit, divided image signals respectively corresponding to the plurality of divided image areas, and calculate evaluation values for the plurality of evaluation areas based on evaluation area image signals respectively corresponding to the plurality of evaluation areas included in the divided image areas, wherein among the plurality of evaluation areas, the plurality of calculation units calculate an evaluation value for each evaluation area that entirely fits in any of the plurality of divided image areas, and do not calculate an evaluation value for each evaluation area that spans two or more of the plurality of divided image areas.

According to a second aspect of the present invention, there is provided an image processing apparatus comprising: an acquisition unit configured to acquire an image signal; a setting unit configured to set, in an image expressed by the image signal, a plurality of evaluation areas to be targets of evaluation value calculation; a dividing unit configured to divide the image expressed by the image signal into a plurality of divided image areas; and a plurality of calculation units configured to acquire, from the dividing unit, divided image signals respectively corresponding to the plurality of divided image areas, and calculate evaluation values for the plurality of evaluation areas based on evaluation area image signals respectively corresponding to the plurality of evaluation areas included in the divided image areas, wherein the setting unit sets the plurality of evaluation areas such that each of the evaluation areas entirely fits in any of the plurality of divided image areas, without spanning two or more of the plurality of divided image areas.

According to a third aspect of the present invention, there is provided a control method for an image processing apparatus comprising: an acquiring step of acquiring an image signal; a setting step of setting, in an image expressed by the image signal, a plurality of evaluation areas to be targets of evaluation value calculation; a dividing step of dividing the image expressed by the image signal into a plurality of divided image areas; and a calculating step in which a plurality of calculation units acquire divided image signals respectively corresponding to the plurality of divided image areas, and calculate evaluation values for the plurality of evaluation areas based on evaluation area image signals respectively corresponding to the plurality of evaluation areas included in the divided image areas, wherein in the calculating step, among the plurality of evaluation areas, an evaluation value is calculated for each evaluation area that entirely fits in any of the plurality of divided image areas, and an evaluation value is not calculated for each evaluation area that spans two or more of the plurality of divided image areas.

According to a fourth aspect of the present invention, there is provided a control method for an image processing apparatus comprising: an acquiring step of acquiring an image signal; a setting unit step of setting, in an image expressed by the image signal, a plurality of evaluation areas to be targets of evaluation value calculation; a dividing step of dividing the image expressed by the image signal into a plurality of divided image areas; and a calculating step in which a plurality of calculation units acquire divided image signals respectively corresponding to the plurality of divided image areas, and calculate evaluation values for the plurality of evaluation areas based on evaluation area image signals respectively corresponding to the plurality of evaluation areas included in the divided image areas, wherein in the setting step, the plurality of evaluation areas are set such that each of the evaluation areas entirely fits in any of the plurality of divided image areas, without spanning two or more of the plurality of divided image areas.

According to the above configuration, the present invention enables suppressing the occurrence of the calculation of an evaluation value for a detection area that spans multiple areas obtained by dividing an image.

Further features of the present invention will become apparent from the following description of exemplary embodiments with reference to the attached drawings.

BRIEF DESCRIPTION OF THE DRAWINGS

FIG. 1 is a block diagram showing a configuration of a digital video camera (DVC) 100 according to embodiments of the present invention.

FIG. 2A is a conceptual diagram showing the division of a video signal by a signal distribution unit 12.

FIGS. 2B to 2D are diagrams showing examples of detection area setting.

FIG. 4 is a conceptual diagram showing detection area movement.

FIG. 5 is a flowchart showing processing for detection area setting and evaluation value calculation according to a first embodiment.

Figures 6A, 6B, 6C:
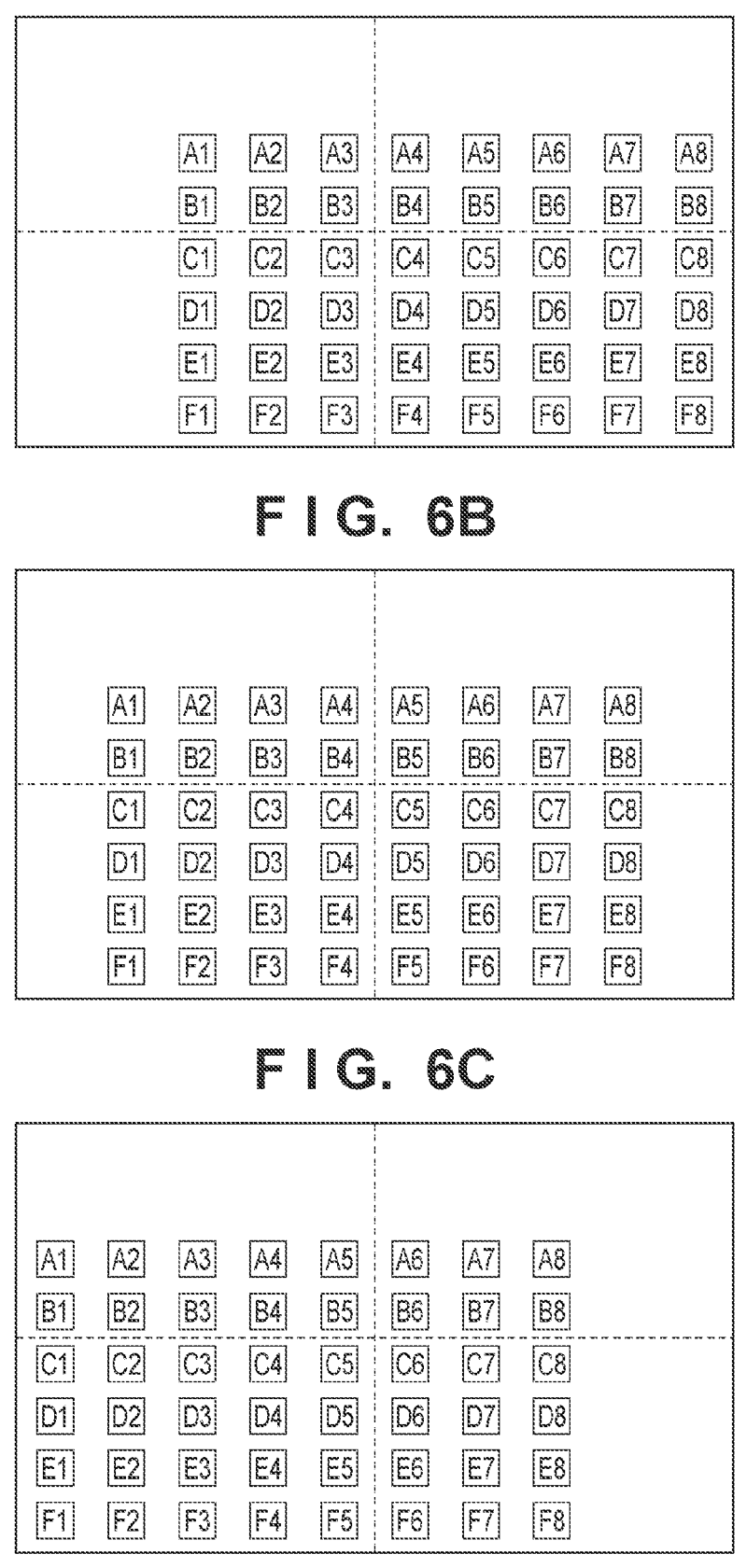
Figures 6D, 6E, 6F:
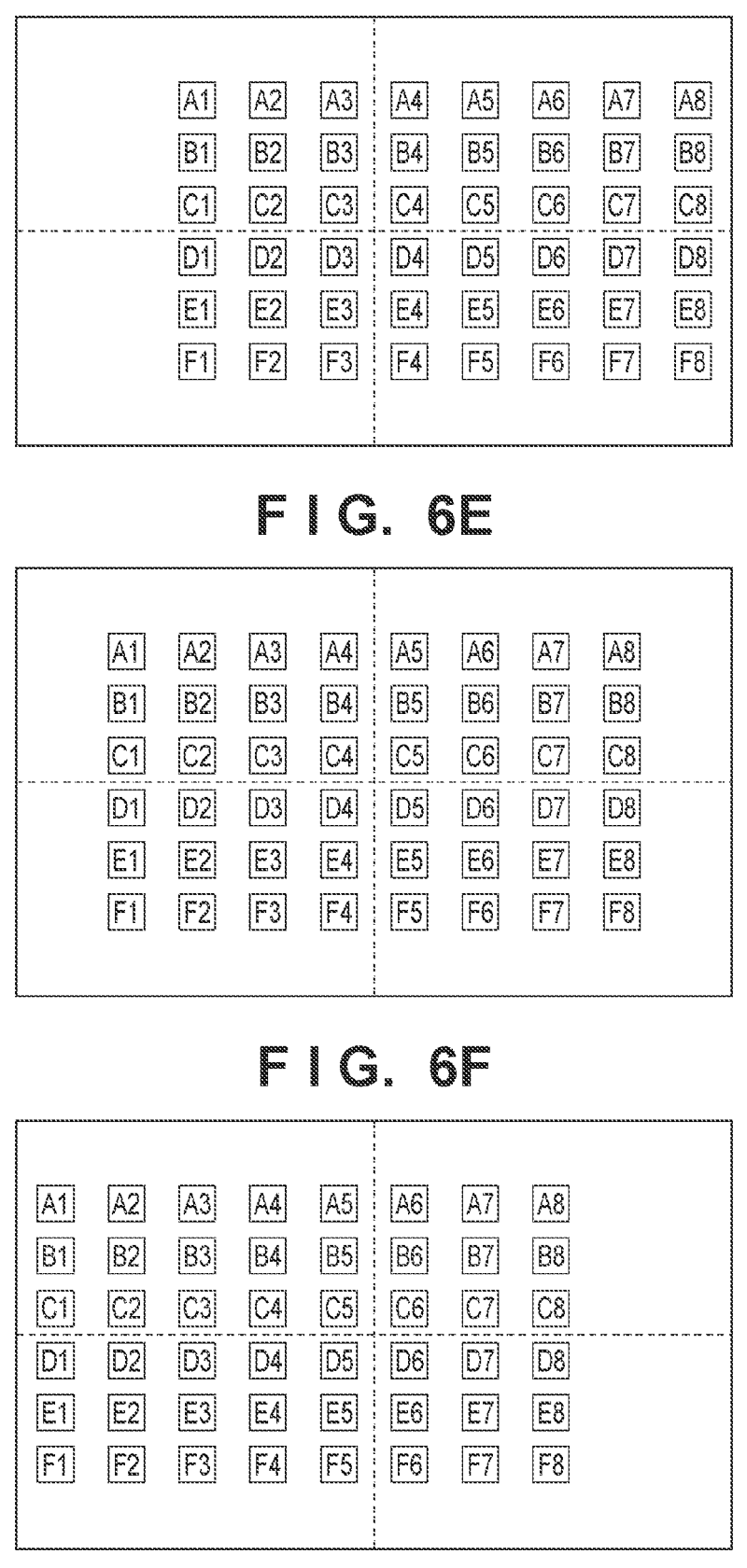
Figures 6G, 6H, 6I:
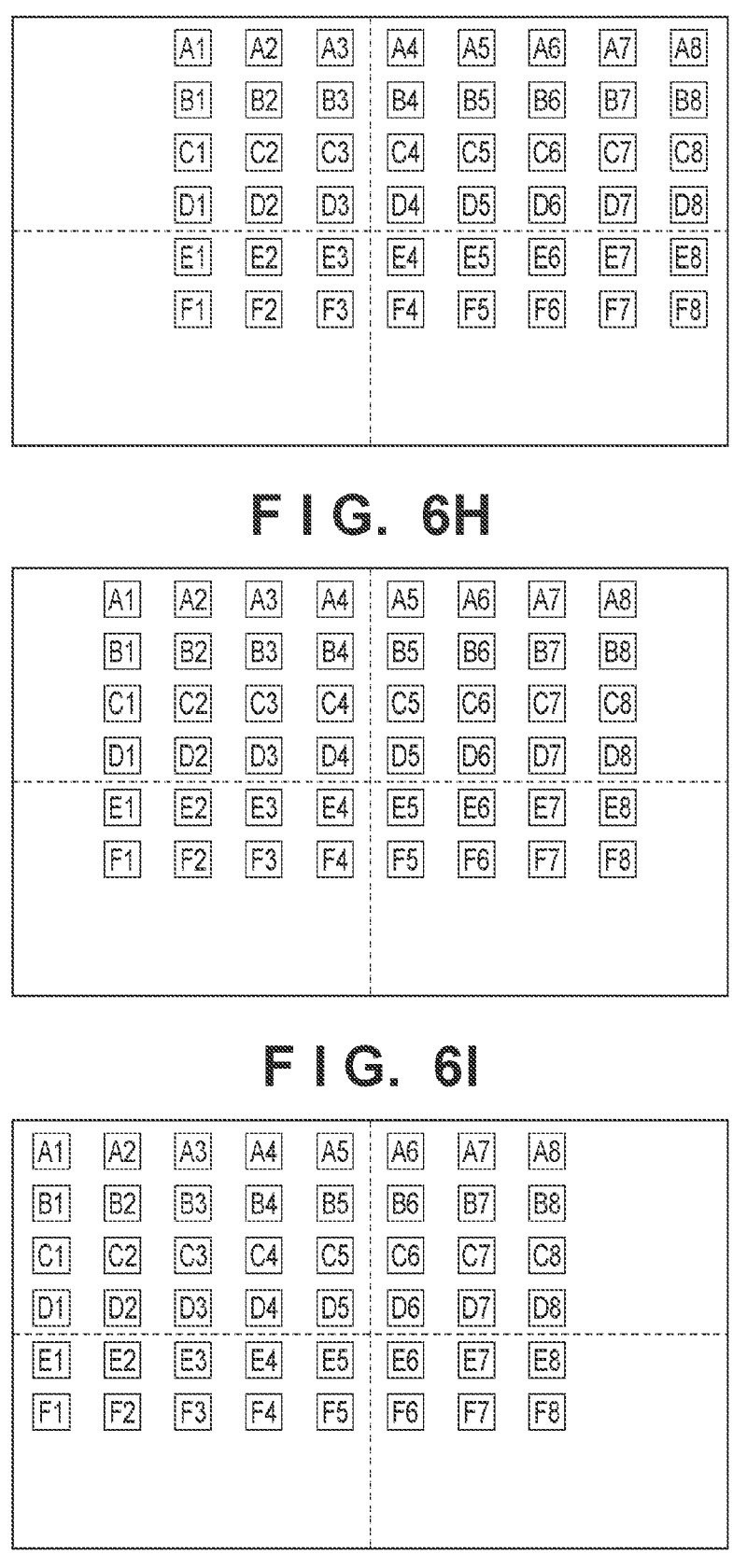

FIGS. 6A to 6I are conceptual diagrams showing detection area arrangement patterns.

FIG. 7 is a flowchart showing processing for detection area setting and evaluation value calculation according to a second embodiment.

DESCRIPTION OF THE EMBODIMENTS

Figure 3A:
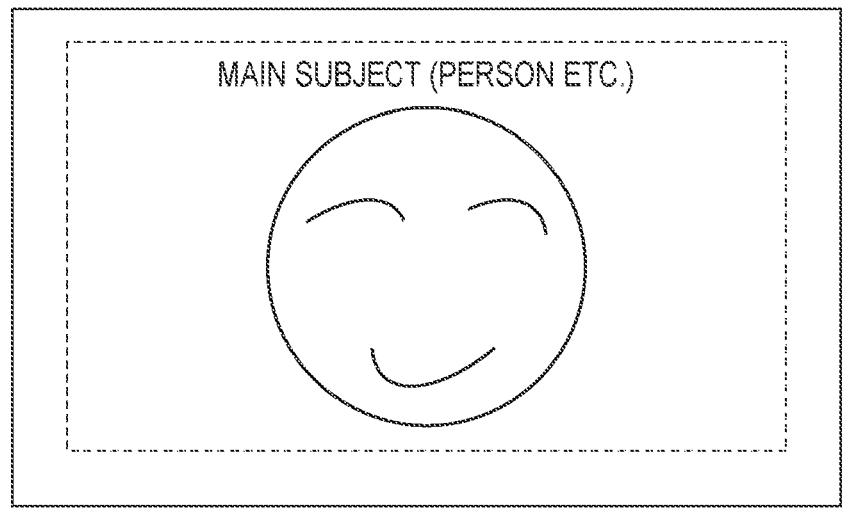
FIGS. 3A and 3B are conceptual diagrams showing subject detection.

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

The following is a description of embodiments in which an image processing apparatus of the present invention is applied to a digital video camera (DVC). Although the processing of video is described in the following embodiments, there is no limitation to video, and the following embodiments are similarly applicable to a still image as well.

FIG. 1 is a block diagram showing the configuration of a DVC 100 according to embodiments of the present invention. The DVC 100 includes a lens 10 that inputs light and a CMOS sensor 11 serving as an imaging element that converts the light input through the lens 10 into an electrical signal.

The DVC 100 also includes a signal distribution unit 12 that acquires a video signal (image signal) from the CMOS sensor 11 and divides the acquired video signal. Specifically, the signal distribution unit 12 divides the CMOS sensor 11 into multiple (e.g., four) areas (divided image areas) as shown in FIG. 2A. The signal distribution unit 12 then distributes video signals corresponding to the areas (divided image signals) to camera signal processing units 13-1, 13-2, 13-3, and 13-4 respectively, as output.

The DVC 100 includes the camera signal processing units 13-1, 13-2, 13-3, and 13-4 that process video signals distributed from the signal distribution unit 12 as output. In the following description, the camera signal processing units 13-1, 13-2, 13-3, and 13-4 are collectively referred to as camera signal processing units 13. Each of the camera signal processing units 13 (calculation units) is configured so as to acquire a divided image signal from the signal distribution unit 12, and calculate an evaluation value from the video signal (evaluation area image signal) in an area (also referred to as the detection area or the evaluation area) that has been set in the video (in the corresponding divided image area). Although there are no particular limitations on the type of evaluation value in the present invention, examples include an exposure evaluation value related to the exposure condition of the video, a focus evaluation value related to the focus condition of the video, a color evaluation value related to colors in the video, and a motion vector evaluation value related to a motion vector in the video.

The DVC 100 furthermore includes a camera system control unit 14. The camera system control unit 14 sets multiple detection areas in the video, and notifies the camera signal processing units 13 of the locations of the set detection areas. The camera system control unit 14 also performs video image quality control (e.g., exposure control, focus control, white balance control, or anti-shake control) in conjunction with the camera signal processing units 13 based on the evaluation values calculated by the camera signal processing units 13. Details of detection area setting and evaluation value calculation will be described later in embodiments.

The DVC 100 also includes a signal coupling unit 15 that couples the video signals of the areas processed by the camera signal processing units 13, and a video signal processing unit 16 that encodes and standardizes the video signal output by the signal coupling unit 15. The DVC 100 furthermore includes a recording unit 17 that records the video signal output by the video signal processing unit 16 onto a recording medium such as an HDD or a memory, and a display unit 18 that is connected to an LCD panel, an external device (e.g., a 4 K×2 K monitor), or the like. The DVC 100 moreover includes an operation input unit 19 by which a user instructs the DVC 100 to perform various types of operations, and a ROM 20 that holds various types of data and programs executed by the camera system control unit 14.

First Embodiment

The following describes detection area setting and evaluation value calculation according to the first embodiment. The camera system control unit 14 can set an arbitrary number of detection areas at arbitrary locations in a video. For example, the camera system control unit 14 may discretely set multiple detection areas as shown by "A1" and the like in FIGS. 2B and 2C. Alternatively, the camera system control unit 14 may set detection areas in the video in a mesh-like fashion with no space in between, as shown in FIG. 2D. Specifically, in the detection of a motion vector in an image or the like, detection areas are arranged in a mesh-like fashion, and a motion vector is detected (and a motion vector evaluation value is calculated) in the detection areas.

Figure 3B:
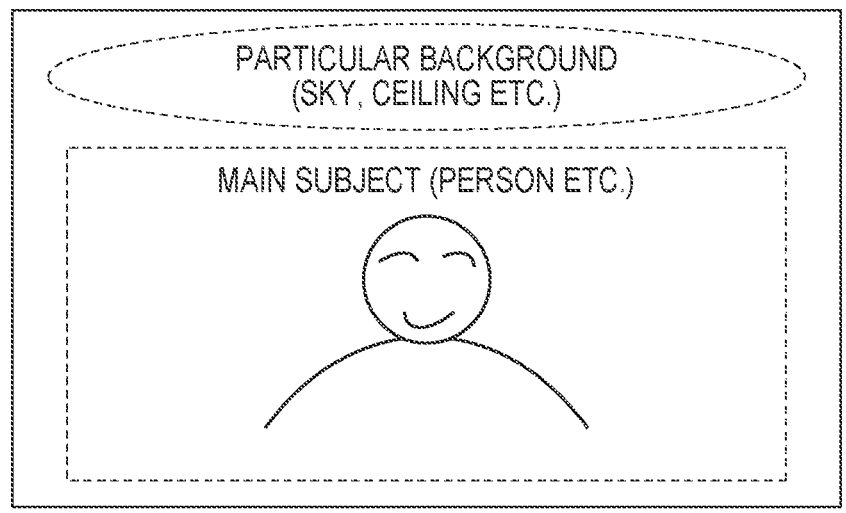

The camera system control unit 14 may also move the detection areas according to, for example, subject information (e.g., face detection), imaging environment information (e.g., camera shake detection or backlit environment detection), or imaging mode information (e.g., portrait mode or face prioritization mode). For example, assume that the camera system control unit 14 has initially set detection areas as shown in FIG. 2B. If a subject has been detected at this time in the angle of view as a whole through a face detection function or the like as shown in FIG. 3A, the camera system control unit 14 does not change the detection areas. However, if the sky, a ceiling, or the like has been detected in the upper portion of the angle of view as shown in FIG. 3B, the camera system control unit 14 moves the detection areas as shown by the arrow from the top level in FIG. 4 to the middle level in FIG. 4 (the bottom level in FIG. 4 will be described in another embodiment). This is done in order to, in the case of exposure control for example, determine the face area as the main subject and perform control with priority on the face area by lowering the background area such as the sky or the ceiling in the priority order for exposure control (also called face prioritization AE mode or the like). Also, in the case of anti-shake control and focus control, the background area such as the sky or the ceiling is a flat area with comparatively little variation (an image with a low luminance variation frequency), and therefore even if an evaluation value such as a motion vector evaluation value or a focus evaluation value is calculated, the calculation result will not be very effective. On the contrary, such a calculation result may lead to erroneous control, and therefore the camera system control unit 14 performs control so as to prevent detection areas from being set in such a background area.

The camera system control unit 14 notifies the camera signal processing units 13 of the locations of the detection areas set in this way.

Next is a description of evaluation value calculation. Although none of the detection areas in FIG. 2B and the top level in FIG. 4 span more than one (two or more) of the areas obtained by the dividing performed by the signal distribution unit 12, some of the detection areas in FIGS. 2C, 2D, and the middle level in FIG. 4 span multiple areas. For the detection areas that do not span multiple areas, the camera signal processing units 13 calculate evaluation values based on the video signals in such detection areas, and for the detection areas that span multiple areas, the camera signal processing units 13 do not calculate evaluation values. Accordingly, the detection areas targeted for evaluation value calculation are all detection areas that fit inside one area, without spanning multiple areas. In other words, the camera signal processing units 13-1, 13-2, 13-3, and 13-4 can each independently calculate evaluation values for the detection areas in the area for which they are to perform processing.

FIG. 5 is a flowchart showing processing for detection area setting and evaluation value calculation according to the first second embodiment. In step S51, the camera system control unit 14 detects the imaging scene (a subject condition, an imaging environment condition, an imaging mode condition, or the like). In step S52, the camera system control unit 14 sets detection areas in the video based on the detected imaging scene (or moves detection areas as necessary, if they have already been set). The detection areas are moved in accordance with, for example, a program stored in advance by the camera system control unit 14. The camera system control unit 14 notifies the camera signal processing units 13 of the set detection areas.

In step S53, the camera signal processing units 13 each determine whether a detection area that spans more than one of the areas (signal processing areas) obtained by the dividing performed by the signal distribution unit 12 exists. If such a detection area exists (e.g., the cases shown in FIGS. 2C and 2D and the middle level in FIG. 4), the procedure advances to step S54, and if such a detection area does not exist (e.g., the case shown in FIG. 2B), the procedure advances to step S55.

In step S54, the camera signal processing units 13 calculate evaluation values for the detection areas that do not span multiple signal processing areas. At this time, the camera signal processing units 13 do not calculate evaluation values for the detection areas that span multiple signal processing areas. On the other hand, in step S55 the camera signal processing units 13 calculate evaluation values for all of the detection areas.

In step S56, the camera signal processing units 13 and the camera system control unit 14 perform image quality control by performing video signal processing based on the calculated evaluation values. When performing image quality control, regarding, the camera signal processing units 13 and the camera system control unit 14 may handle a detection area for which an evaluation value was not calculated as "no evaluation value", or may use the evaluation value of a neighboring detection area or an average evaluation value of the entire image as a substitute.

As described above, according to the present embodiment, for detection areas that do not span multiple areas, the camera signal processing units 13 calculate evaluation values based on the video signals in such detection areas, and evaluation values are not calculated for detection areas that span multiple areas. This enables suppressing the occurrence of the calculation of an evaluation value for a detection area that spans multiple areas obtained by dividing an image.

Second Embodiment

The following describes detection area setting and evaluation value calculation according to a second embodiment. The camera system control unit 14 can set an arbitrary number of detection areas at arbitrary locations in a video, as long as the location is not a location that spans more than one of the areas obtained by the dividing performed by the signal distribution unit 12. In other words, the camera system control unit 14 sets the detection areas such that each entirely fits in any of the areas, without spanning multiple areas, as shown in FIG. 2B for example. Accordingly, in the second embodiment, the camera system control unit 14 does not set detection areas as shown in FIGS. 2C and 2D (detection areas may be set in a mesh-like fashion as long as no detection area spans multiple areas). In order to realize the detection area setting according to the second embodiment, the camera system control unit 14 holds the arrangement patterns shown in FIGS. 6A to 6I in a data table in the ROM 20 (storage unit), for example. The camera system control unit 14 selects an arrangement pattern according to a predetermined criterion, and accordingly sets the detection areas.

The camera system control unit 14 may also move the detection areas according to, for example, subject information (e.g., face detection), imaging environment information (e.g., camera shake detection or backlit environment detection), or imaging mode information (e.g., portrait mode or face prioritization mode). However, if detection areas set as shown in the top level in FIG. 4 similarly to the first embodiment are, for example, moved to the locations shown in the middle level in FIG. 4, some of the detection areas will span more than one of the areas obtained by the dividing performed by the signal distribution unit 12. In view of this, in the second embodiment, in the case where a moved detection area spans multiple areas, the camera system control unit 14 further moves the detection areas as shown by the arrow from the middle level in FIG. 4 to the bottom level in FIG. 4. In other words, if a detection area that spans multiple areas exists among the moved detection areas, the camera system control unit 14 performs control so as to further move the detection areas until such a detection area no longer exists.

FIG. 7 is a flowchart showing processing for detection area setting and evaluation value calculation according to the second embodiment. In step S71, the camera system control unit 14 detects the imaging scene (a subject condition, an imaging environment condition, an imaging mode condition, or the like). In step S72, the camera system control unit 14 sets detection areas in the video based on the detected imaging scene (or moves detection areas as necessary, if they have already been set). The detection areas are moved in accordance with, for example, a program stored in advance by the camera system control unit 14.

In step S73, the camera system control unit 14 determines whether a detection area that spans more than one of the areas (signal processing areas) obtained by the dividing performed by the signal distribution unit 12 exists. If such a detection area exists (e.g., the cases shown in FIGS. 2C and 2D and the middle level in FIG. 4), the procedure advances to step S74, and if such a detection area does not exist (e.g., the cases shown in FIG. 2B and the bottom level in FIG. 4), the procedure advances to step S75.

In step S74, the camera system control unit 14 sets a detection area movement amount in accordance with the program stored in advance (or changes the movement amount, if it has already been set). Thereafter, the procedure returns to step S72, and the detection areas are moved until a detection area that spans multiple areas no longer exists (e.g., the detection areas are moved from the state shown in the top level in FIG. 4, to the state shown in the middle level, and finally to the state shown in the bottom level). Note that if there is no arrangement pattern according to which none of the moved detection areas span multiple areas, the camera system control unit 14 may return the detection areas to the state they were in before the moving.

In step S75, the camera system control unit 14 notifies the camera signal processing units 13 of the set detection areas, and the camera signal processing units 13 calculate evaluation values for all of the detection areas. In step S76, the camera signal processing units 13 and the camera system control unit 14 perform image quality control by performing video signal processing based on the calculated evaluation values.

According to the above-described processing, even if detection areas are moved according to the imaging scene, the detection areas are set so as to not span multiple areas.

Note that instead of further moving the detection areas if a moved detection area spans multiple areas, an arrangement pattern may be prepared in advance such that the moved detection areas do not span multiple areas. For example, the DVC 100 may use the arrangement pattern shown in FIG. 6E as the initial state arrangement pattern, and hold the arrangement patterns shown in FIGS. 6A to 6D and FIGS. 6F to 6I in the ROM 20 as candidates for the moved state arrangement pattern. In this case, when moving the detection areas, the camera system control unit 14 selects a moved state arrangement pattern from among the candidates.

As described above, according to the present embodiment, the camera system control unit 14 sets detection areas such that each entirely fits in any of the areas, without spanning multiple areas. This enables suppressing the occurrence of the calculation of an evaluation value for a detection area that spans multiple areas obtained by dividing an image.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195056, filed on Aug. 31, 2010, which is hereby incorporated by reference herein in its entirety.

What is claimed is:

1. An image processing apparatus comprising:
   one or more processors implementing the functions of an acquisition unit, a setting unit, a dividing unit, a determination unit, a plurality of calculation units, a plurality of image processing units and a coupling unit, wherein:
   the acquisition unit is configured to acquire an image signal;
   the setting unit is configured to set, in an image expressed by the image signal, a plurality of evaluation areas to be targets of evaluation value calculation;
   the dividing unit is configured to divide the image expressed by the image signal into a plurality of divided image areas;
   the determination unit is configured to determine whether or not there exist, among the plurality of evaluation areas, one or more evaluation areas that span two or more of the plurality of divided image areas;
   each of the plurality of calculation units is configured to:
      acquire, from the dividing unit, each divided image signal corresponding to each of the plurality of divided image areas;
      if it is determined by the determination unit that there do not exist said one or more evaluation areas that span two or more of the plurality of divided image areas, calculate evaluation values for the plurality of evaluation areas in each of the plurality of divided image areas; and
      if it is determined by the determination unit that there exist said one or more evaluation areas that span two or more of the plurality of divided image areas, calculate evaluation values for the plurality of evaluation areas in each of the plurality of divided image areas except for said one or more evaluation areas that span two or more of the plurality of divided image areas;
   each of the plurality of image processing units is configured to perform image processing on each of the plurality of divided image areas based on the evaluation values of the plurality of divided image areas calculated by the plurality of calculation units; and
   the coupling unit is configured to couple the image signals of the divided image areas each of which is output from each of the plurality of image processing units.

2. The image processing apparatus according to claim 1, wherein the setting unit sets the plurality of evaluation areas based on subject information, imaging environment information, or imaging mode information of the image signal.

3. The image processing apparatus according to claim 1, wherein each of the plurality of calculation units uses, as an evaluation value for an evaluation area that spans two or more of the plurality of divided image areas, an evaluation value for a neighboring evaluation area.

4. The image processing apparatus according to claim 1, wherein each of the plurality of calculation units calculates, as the evaluation values for the plurality of evaluation areas, exposure evaluation values related to exposure conditions of the plurality of evaluation areas, focus evaluation values related to focus conditions of the plurality of evaluation areas, color evaluation values related to colors in the plurality of evaluation areas, and motion vector evaluation values related to motion vectors in the plurality of evaluation areas.

5. The image processing apparatus according to claim 1, further comprising:
   an encoding unit configured to encode the image signal output from the coupling unit;
   a display configured to display, on a display medium, an image of the image signal output from the coupling unit; and
   a recording unit configured to record, on a recording medium, the image signal output from the coupling unit,
   wherein the one or more processors implement the functions of the encoding unit and the recording unit.

6. An image processing apparatus comprising:
   one or more processors implementing the functions of an acquisition unit, a setting unit, a dividing unit, a determination unit, a plurality of calculation units, a plurality of image processing units and a coupling unit, wherein:
   the acquisition unit is configured to acquire an image signal;
   the setting unit is configured to set, in an image expressed by the image signal, a plurality of evaluation areas to be targets of evaluation value calculation;
   the dividing unit is configured to divide the image expressed by the image signal into a plurality of divided image areas;
   the determination unit is configured to determine whether or not there exist, among the plurality of evaluation areas, one or more evaluation areas that span two or more of the plurality of divided image areas;
   each of the plurality of calculation units is configured to acquire, from the dividing unit, each divided image signal corresponding to each of the plurality of divided image areas, and calculate evaluation values for the plurality of evaluation areas in each of the plurality of divided image areas;
   each of the plurality of image processing units is configured to perform image processing on each of the plurality of divided image areas based on the evaluation values of the plurality of divided image areas calculated by the plurality of calculation units; and
   the coupling unit is configured to couple the image signals of the divided image areas each of which is output from each of the plurality of image processing units, and
   wherein if it is determined by the determination unit that there exist said one or more evaluation areas that span two or more of the plurality of divided image areas, the setting unit moves the plurality of evaluation areas so that none of the plurality of the evaluation areas spans two or more of the plurality of divided image areas.

7. The image processing apparatus according to claim 6, wherein the setting unit sets the plurality of evaluation areas based on subject information, imaging environment information, or imaging mode information of the image signal.

8. The image processing apparatus according to claim 6, wherein each of the plurality of calculation units calculates, as the evaluation values for the plurality of evaluation areas, exposure evaluation values related to exposure conditions of the plurality of evaluation areas, focus evaluation values related to focus conditions of the plurality of evaluation areas, color evaluation values related to colors in the plurality of evaluation areas, and motion vector evaluation values related to motion vectors in the plurality of evaluation areas.

9. The image processing apparatus according to claim 6, further comprising:
   an encoding unit configured to encode the image signal output from the coupling unit;
   a display configured to display, on a display medium, an image of the image signal output from the coupling unit; and
   a recording unit configured to record, on a recording medium, the image signal output from the coupling unit,
   wherein the one or more processors implement the functions of the encoding unit and the recording unit.

10. A control method for an image processing apparatus comprising:
    an acquiring step of acquiring an image signal;
    a setting step of setting, in an image expressed by the image signal, a plurality of evaluation areas to be targets of evaluation value calculation;
    a dividing step of dividing the image expressed by the image signal into a plurality of divided image areas; and
    a determination step of determining whether or not there exist, among the plurality of evaluation areas, one or more evaluation areas that span two or more of the plurality of divided image areas;
    a calculating step in which each of a plurality of calculation units:
      acquires each divided image signal corresponding to each of the plurality of divided image areas;
      if it is determined in the determination step that there do not exist said one or more evaluation areas that span two or more of the plurality of divided image areas, calculates evaluation values for the plurality of evaluation areas in each of the plurality of divided image areas; and
      if it is determined in the determination step that there exist said one or more evaluation areas that span two or more of the plurality of divided image areas, calculates evaluation values for the plurality of evaluation areas in each of the plurality of divided image areas except for said one or more evaluation areas that span two or more of the plurality of divided image areas;
    an image processing step of performing image processing, by each of a plurality of image processing units, on each of the plurality of divided image areas based on the evaluation values of the plurality of divided image areas calculated by the plurality of calculation units; and
    a coupling step of coupling the image signals of the divided image areas each of which is output from each of the plurality of image processing units.

11. A control method for an image processing apparatus comprising:
    an acquiring step of acquiring an image signal;
    a setting step of setting, in an image expressed by the image signal, a plurality of evaluation areas to be targets of evaluation value calculation;
    a dividing step of dividing the image expressed by the image signal into a plurality of divided image areas; and
    a determination step of determining whether or not there exist, among the plurality of evaluation areas, one or more evaluation areas that span two or more of the plurality of divided image areas;

a calculating step in which each of a plurality of calculation units acquires each divided image signal corresponding to each of the plurality of divided image areas, and calculates evaluation values for the plurality of evaluation areas in each of the plurality of divided image areas;

an image processing step of performing image processing, by each of a plurality of image processing units, on each of the plurality of divided image areas based on the evaluation values of the plurality of divided image areas calculated by the plurality of calculation units; and a coupling step of coupling the image signals of the divided image areas each of which is output from each of the plurality of image processing units, and wherein if it is determined in the determination step that there exist said one or more evaluation areas that span two or more of the plurality of divided image areas, in the setting step, the plurality of evaluation areas are moved so that none of the plurality of the evaluation areas spans two or more of the plurality of divided image areas.

12. An image processing apparatus comprising:

one or more processors implementing the functions of an acquisition unit, a setting unit, a dividing unit, a determination unit, a plurality of calculation units, a plurality of image processing units and a coupling unit, wherein:

the acquisition unit is configured to acquire an image signal;

the setting unit is configured to set, in an image expressed by the image signal, a plurality of evaluation areas to be targets of evaluation value calculation;

the dividing unit is configured to divide the image expressed by the image signal into a plurality of divided image areas each of which is larger than the evaluation area;

each of the plurality of calculation units is configured to acquire, from the dividing unit, each divided image signal corresponding to each of the plurality of divided image areas, and calculate evaluation values for the plurality of evaluation areas in each of the plurality of divided image areas;

the image processing apparatus further comprises a storage configured to hold a plurality of arrangement patterns for the plurality of evaluation areas in the image expressed by the image signal;

each of the plurality of image processing units is configured to perform image processing on each of the plurality of divided image areas based on the evaluation values of the plurality of divided image areas calculated by the plurality of calculation units; and the coupling unit is configured to couple the image signals of the divided image areas each of which is output from each of the plurality of image processing units, and wherein each of the plurality of arrangement patterns is an arrangement pattern according to which each of the plurality of evaluation areas entirely fits in any of the plurality of divided image areas, without spanning two or more of the plurality of divided image areas, and the setting unit selects any of the plurality of arrangement patterns, and sets the plurality of evaluation areas in accordance with the selected arrangement pattern.

13. A control method for an image processing apparatus comprising:

an acquiring step of acquiring an image signal;

a setting step of setting, in an image expressed by the image signal, a plurality of evaluation areas to be targets of evaluation value calculation;

a dividing step of dividing the image expressed by the image signal into a plurality of divided image areas each of which is larger than the evaluation area;

a calculating step in which each of a plurality of calculation units acquires each divided image signal corresponding to each of the plurality of divided image areas, and calculates evaluation values for the plurality of evaluation areas in each of the plurality of divided image areas;

an image processing step of performing image processing, by each of a plurality of image processing units, on each of the plurality of divided image areas based on the evaluation values of the plurality of divided image areas calculated by the plurality of calculation units; and a coupling step of coupling the image signals of the divided image areas each of which is output from each of the plurality of image processing units, and wherein the image processing apparatus comprises a storage unit configured to hold a plurality of arrangement patterns for the plurality of evaluation areas in the image expressed by the image signal, each of the plurality of arrangement patterns being an arrangement pattern according to which each of the plurality of evaluation areas entirely fits in any of the plurality of divided image areas, without spanning two or more of the plurality of divided image areas, and the setting step selects any of the plurality of arrangement patterns, and sets the plurality of evaluation areas in accordance with the selected arrangement pattern.

* * * * *